(12) United States Patent
Billberg (10) Patent No.: US 7,165,702 B1
(45) Date of Patent: Jan. 23, 2007

(54) CARGO MOUNT SYSTEM FOR UTILITY VEHICLES

(75) Inventor: Rusty Billberg, Wannaska, MN (US)

(73) Assignee: Polaris Industries, Inc., Medina, MN (US)

( * ) Notice: Subject to any disclaimer, the term of this patent is extended or adjusted under 35 U.S.C. 154(b) by 414 days.

(21) Appl. No.: 10/685,759

(22) Filed: Oct. 15, 2003

(51) Int. Cl.
*B60R 9/00* (2006.01)

(52) U.S. Cl. ............... 224/401; 224/401; 224/281; 224/554; 224/319

(58) Field of Classification Search .......... 224/401, 224/281, 403, 510, 321, 539, 554, 548, 310, 224/319; 211/94.01, 88.01, 90.01, 162, 48; 296/37.6; 410/77, 80, 81
See application file for complete search history.

(56) References Cited

U.S. PATENT DOCUMENTS

| | | | |
|---|---|---|---|
| 3,589,525 A * | 6/1971 | Allen | 211/162 |
| 4,249,684 A * | 2/1981 | Miller et al. | 224/42.4 |
| 4,266,703 A | 5/1981 | Litz | 224/32 A |
| 4,274,568 A * | 6/1981 | Bott | 224/319 |
| 4,502,619 A | 3/1985 | Cox | 224/311 |
| 4,522,326 A * | 6/1985 | Tuohy, III | 224/310 |
| 4,588,114 A | 5/1986 | Lebaron et al. | 224/32 A |
| 4,752,095 A * | 6/1988 | Brady | 296/37.6 |
| 5,012,880 A | 5/1991 | Abner | 180/89.11 |
| 5,193,696 A * | 3/1993 | Price et al. | 211/162 |
| 5,395,019 A * | 3/1995 | Christensen | 224/511 |
| 5,509,710 A | 4/1996 | Eavenson, Sr. et al. | 296/19 |
| 5,516,180 A | 5/1996 | Eavenson, Sr. et al. | 296/68.1 |
| 5,535,929 A * | 7/1996 | Neill | 224/310 |
| 5,573,300 A | 11/1996 | Simmons | 296/197 |
| 5,702,142 A | 12/1997 | Newell | 296/19 |
| 5,833,103 A * | 11/1998 | Rak | 224/321 |
| 6,029,750 A | 2/2000 | Carrier | 169/52 |
| 6,422,629 B1 | 7/2002 | Lance et al. | 296/37.6 |
| 6,464,277 B1 * | 10/2002 | Wilding | 296/37.6 |
| 6,533,339 B1 * | 3/2003 | Bettin et al. | 296/37.1 |
| 6,786,374 B1 * | 9/2004 | Schlecht | 224/544 |
| 6,929,163 B1 * | 8/2005 | Pedrini et al. | 224/506 |
| 2003/0047576 A1 * | 3/2003 | Babbitt et al. | 224/401 |
| 2004/0232182 A1 * | 11/2004 | Ingram | 224/401 |
| 2005/0199666 A1 * | 9/2005 | Aftanas et al. | 224/321 |

* cited by examiner

Primary Examiner—Nathan J. Newhouse
Assistant Examiner—Justin M. Larson
(74) Attorney, Agent, or Firm—Baker & Daniels LLP (57) ABSTRACT

A cargo retention system is provided that allows the operator of a vehicle removably and securely fasten a cargo module to a vehicle. A guide is provided for aligning the cargo module within the retention system and aiding in the securing of the cargo to the vehicle.

22 Claims, 8 Drawing Sheets

CARGO MOUNT SYSTEM FOR UTILITY VEHICLES

FIELD OF THE INVENTION

The present invention relates to a system for removably fastening a cargo module to a utility vehicle.

BACKGROUND OF THE INVENTION

All terrain vehicles or "ATVs" are receiving increasing attention for use in non-recreational applications. These vehicles are capable of stably traveling over difficult terrain, such as sandy or broken ground, while carrying a significant load of equipment, making them an excellent choice for off-road transportation. The relatively simple construction of the ATV also provides a reliable, low maintenance vehicle. These features have traditionally made the ATV a popular choice among outdoor enthusiasts who have used the vehicle for various sports and leisure activities. However, these features also make the vehicle very useful for reconnaissance, border patrol, search and rescue, remote firefighting, and other non-recreational applications.

ATVs are frequently outfitted with cargo racks for use in transporting objects used by the recreational ATV user. Most of these racks are rather simple platforms or metal bar arrangements without the capability of securely carrying significant loads.

SUMMARY OF THE INVENTION

The present invention provides a system for removably fastening the cargo module to a vehicle. The system satisfies the need to securely and removably attach significant loads to a utility vehicle. More particularly, the present invention provides a system for removably attaching such loads as a large cargo box or toolbox, a stretcher, a fluid tank with a pump, or other modules which may be useful in non-recreational or recreational applications for ATVs.

One embodiment of the cargo system of the present invention includes an elongate guide carried by a vehicle with a guide lock located inside of the guide. A cargo module with a cargo lock which is configured to engage the guide lock can be rested on the guide and slid until the two locks engage each other. When the two locks are engaged, a retaining member can be inserted through a hole in the guide to ensure that the cargo module is retained on the guide.

A second embodiment includes an elongate guide carried by the vehicle for mounting and supporting the cargo module, the guide having two opposing elongate sidewalls. A guide lock is located inside of the guide. At least one sidewall has a hole for receiving a retaining member. The cargo module has a cargo lock and is configured to slide atop the guide walls with the cargo lock retained inside of the guide until the cargo lock engages the guide lock. The sidewall hole is located such that when the guide lock is engaged with the cargo lock, a retaining member may be inserted through the hole to prevent the cargo lock from disengaging from the guide lock thereby securing the cargo module to the vehicle.

BRIEF DESCRIPTION OF THE DRAWINGS

The above and other aspects of the invention will be apparent from the description of embodiments illustrated by the following accompanying drawings.

DETAILED DESCRIPTION

Reference will now be made to the drawings in which the various elements of embodiments of the present invention will be given numerical designations and in which the invention will be discussed so as to enable one skilled in the art to make and use the invention.

It is noted that an all terrain vehicle (ATV) is merely an example vehicle with which the cargo system of the present invention may be used. Although the present invention will be shown and described in the context of an ATV, the invention can also be employed for other utility and recreational vehicles including ATV's with more than four wheels, snowmobiles, tracked vehicles, personal watercraft, boats, motorcycles, and other utility or recreation vehicles in a manner that would be apparent to those of ordinary skill in the art.

Figure 1:
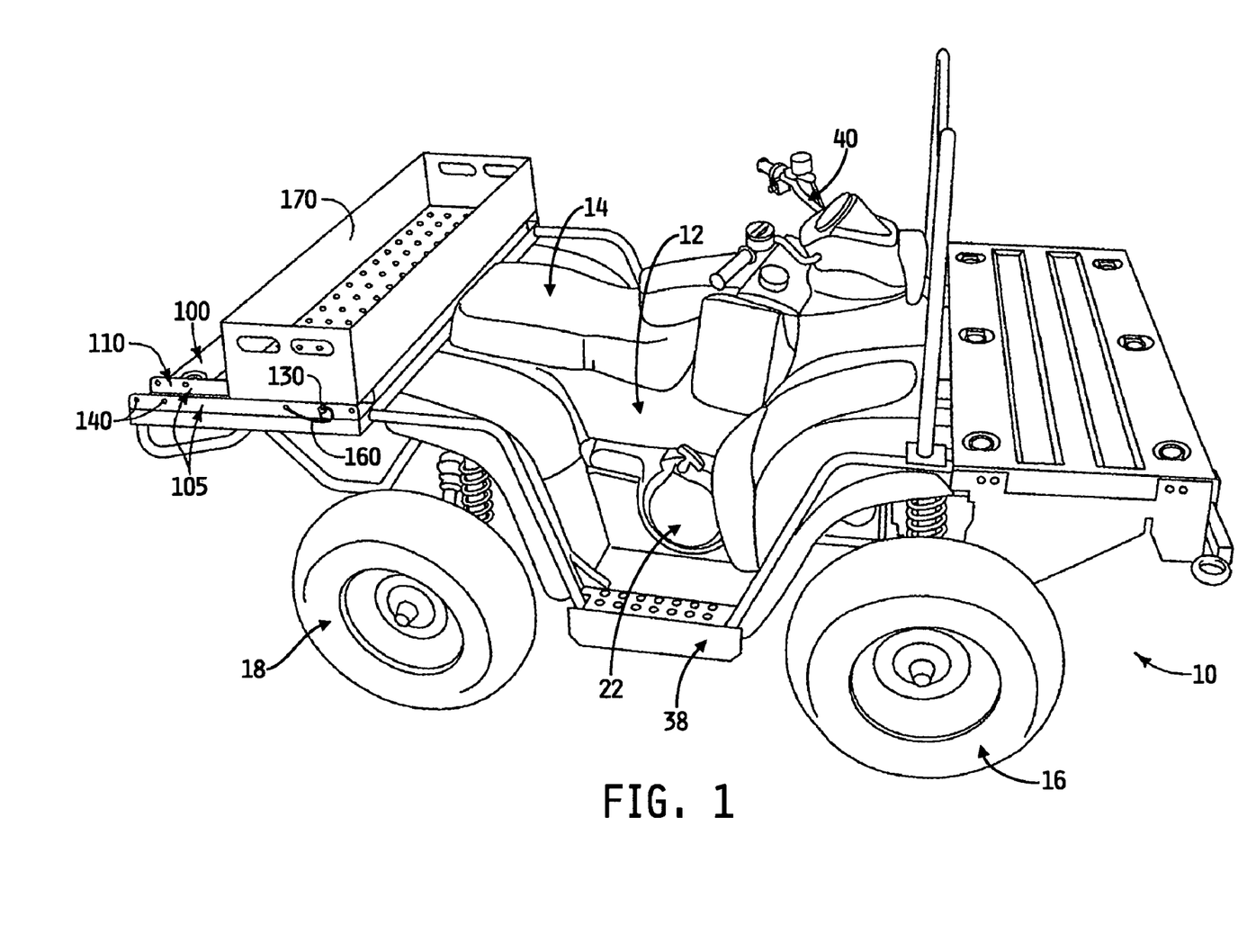
FIG. 1 is a perspective view of a vehicle with a cargo module mounted thereon.

Turning now to the drawings, FIG. 1 is a perspective view of a vehicle with a cargo module mounted thereon. The vehicle in this example is an ATV 10. The ATV 10 includes a chassis 12 carrying a straddle type seat 14. The seat 14 is sufficiently narrow to be straddled by a vehicle rider. The ATV 10 has a left front wheel (not visible in FIG. 1), a right front wheel 16, a left rear wheel (not visible in FIG. 1) and a right rear wheel 18. The ATV 10 also includes an engine 22 that is carried by chassis 12. The engine 22 is preferably coupled to at least some wheels of the ATV 10 via a drive train for propelling the ATV 10. The engine 22 may be used to power each rear wheel, and in some cases, also each front wheel. The ATV 10 also includes a left and right foot rest 38 extending from each side of the chassis, of which only the right foot rest can be seen in FIG. 1. The ATV 10 also includes a member 40 that can be used to steer the ATV 10. The ATV 10 has a rack 100 attached to the vehicle. Attached to the rack 100 is a guide 110 with two sidewalls 105. There are holes 140 through the sidewall 105 through which a retaining member 130 may be passed to secure the cargo module 170 to the guide 110. The retaining member could be a simple pin, a cotter key, or other retaining member known in the art. The retaining member could also be a lock or be fitted with a lock mechanism to provide added security for the cargo module. A cable or wire 160 may be used to secure the retaining member 130 to the guide when the retaining member is not engaged with the sidewall hole 140. While the cargo module is shown as a large box, it should be understood that the module could be a stretcher, a toolbox, a water tank with pump, or any other module of suitable size and usefulness. While the guide 110 is shown a being oriented from front to back of the vehicle 10, it should be understood that the guide 110 could be oriented in any direction relative to the vehicle 10.

Figure 2:
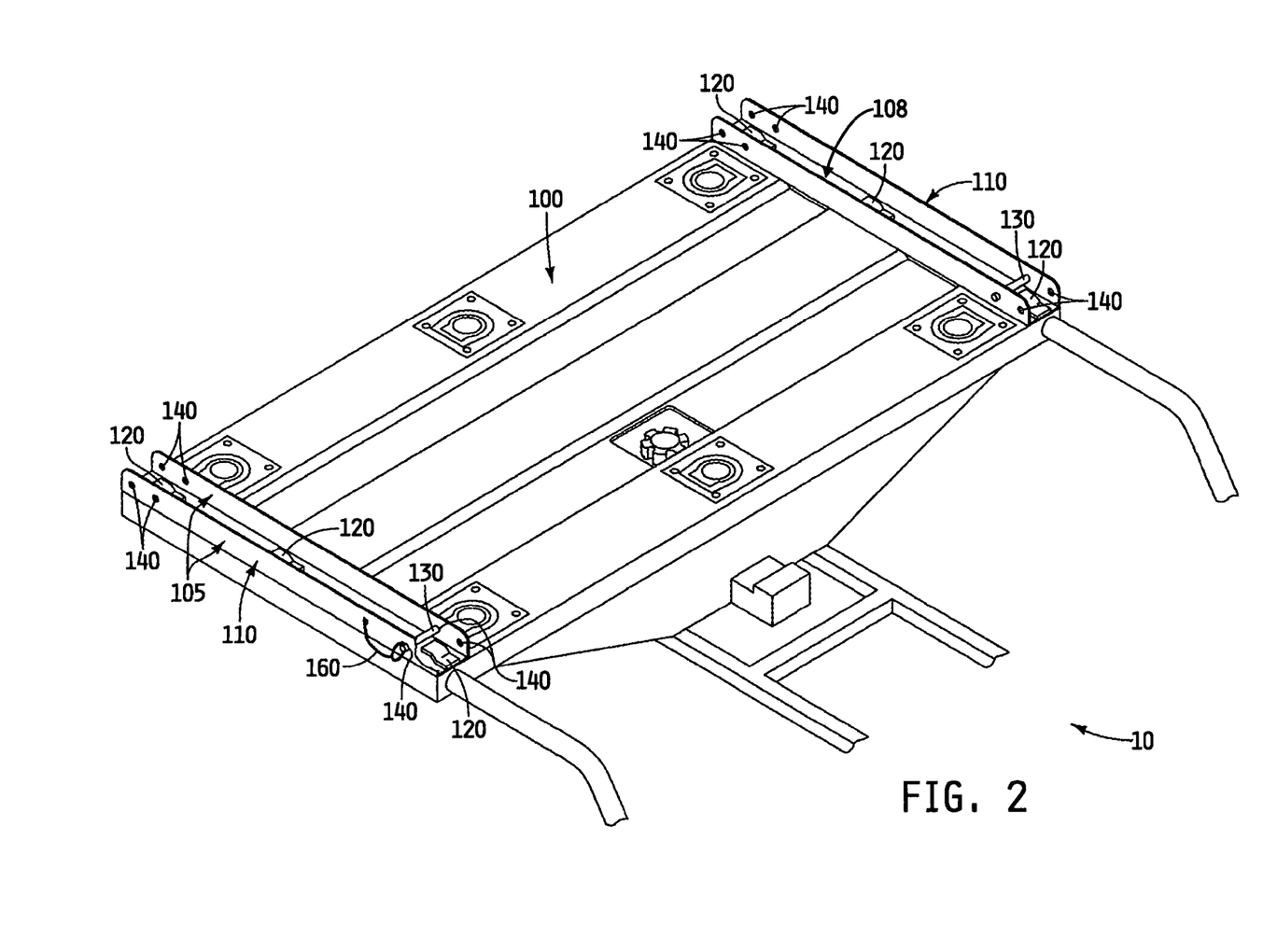
FIG. 2 is a perspective view of one embodiment of the vehicle side of the system.
Figure 7A:
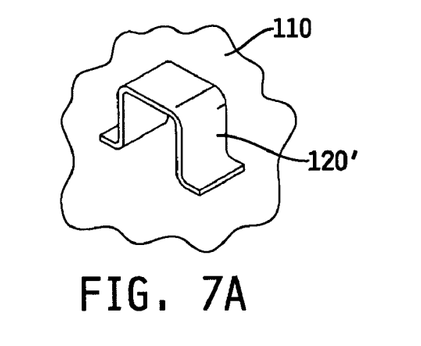
FIG. 7A is a perspective view of a guide lock of the invention.
Figure 8:
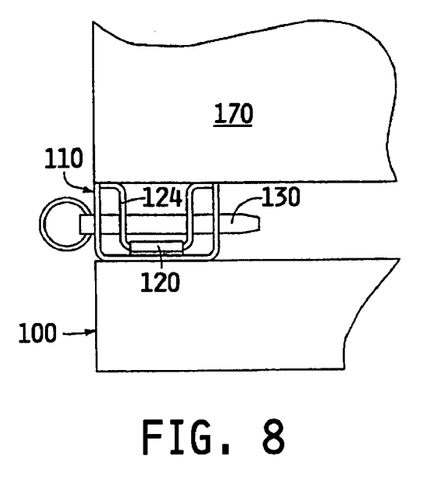
FIG. 8 is a plan view showing a guide, cargo module, guide lock, cargo lock, and retaining member of the invention.
Figure 8A:
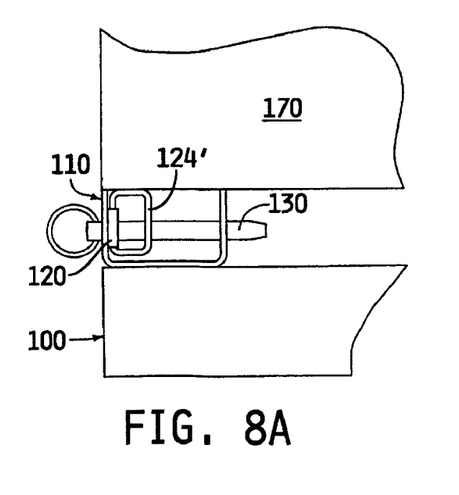
FIG. 8A is a plan view of an alternative arrangement guide lock and cargo lock of the invention.

FIG. 2 is a perspective view of one embodiment of the vehicle side of the system. FIG. 2 shows a rack 100 with a guide 110 in more detail. A guide lock 120 is shown in the bottom of the guide, though it is understood that the guide lock could be on one or both of the sidewalls 105, the bottom 108, or any combination of the bottom 108 or sidewalls 105 of the guide (FIGS. 8 and 8A). The guide lock is shown as a tab configuration, although the guide lock could be configured in any fashion, for example, as a loop 120' (FIG. 7A), hole, hook or any locking engagement mechanism as will be obvious to those skilled in the art. The guides 110 shown in FIG. 2 are shown as being attached to the top surface of the rack 100. This is but one exemplary embodiment of the invention and is not intended to be limiting. For example, the rack could be a collection of metal rods, a platform as shown, or any other cargo rack as is known in the art. The guides may be installed above the rack as shown, at the same level as the rack, below the rack, or at any configuration useful to the particular application. FIG. 2 also shows the sidewalls 105, the retaining member 130, the sidewall holes 140, and the retaining member cable 160.

Figure 3:
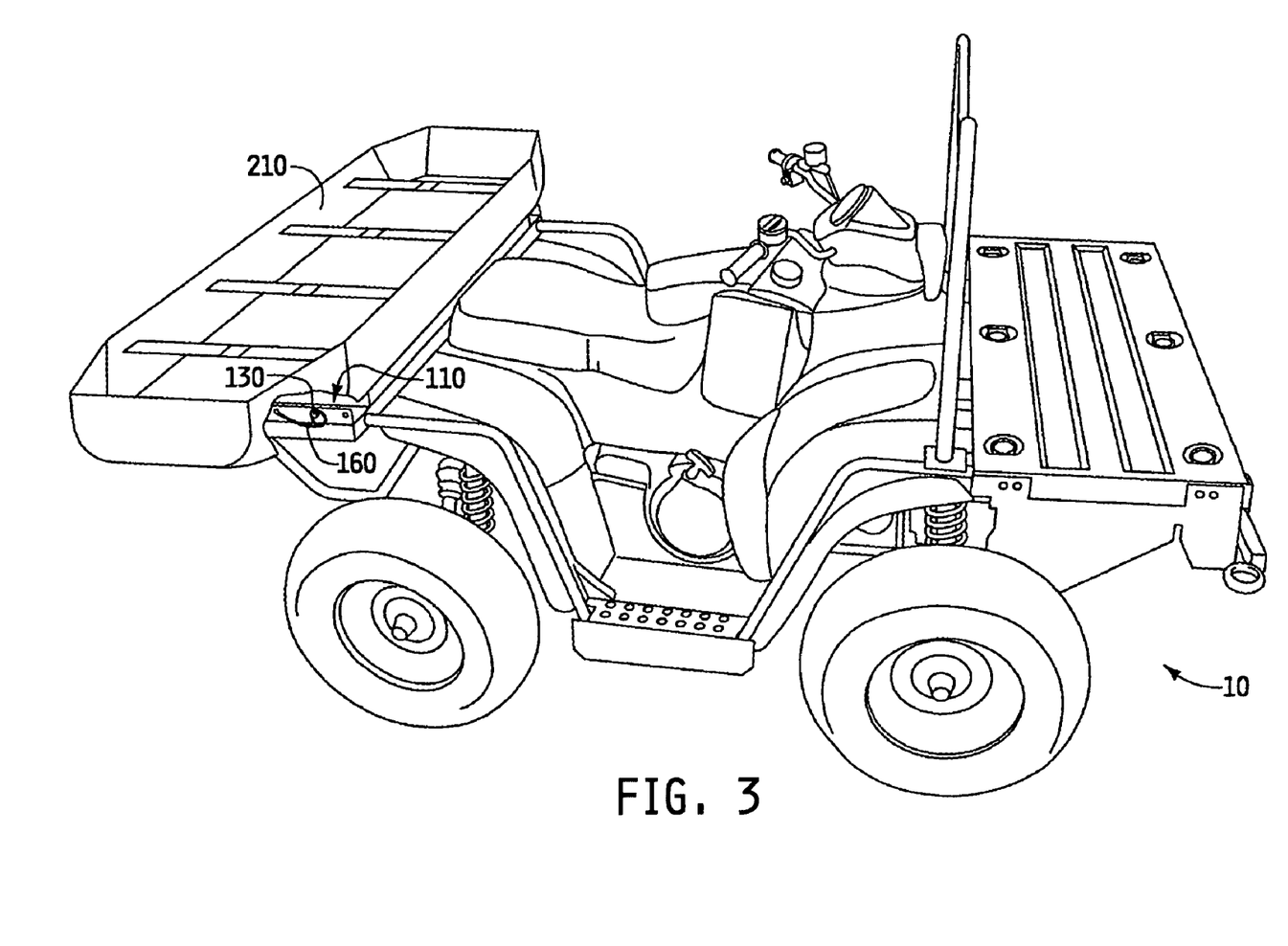
FIG. 3 is a perspective view of a vehicle with a cargo module mounted thereon wherein the cargo module is a stretcher.

FIG. 3 is a perspective view of a vehicle with a cargo module mounted thereon wherein the cargo module is a stretcher. A portion of the cargo module 210 is cut away to show a guide 110, a retaining member 130, and a cable or wire 160. As stated previously, the invention is not limited to any particular type of vehicle or cargo module.

Figure 4:
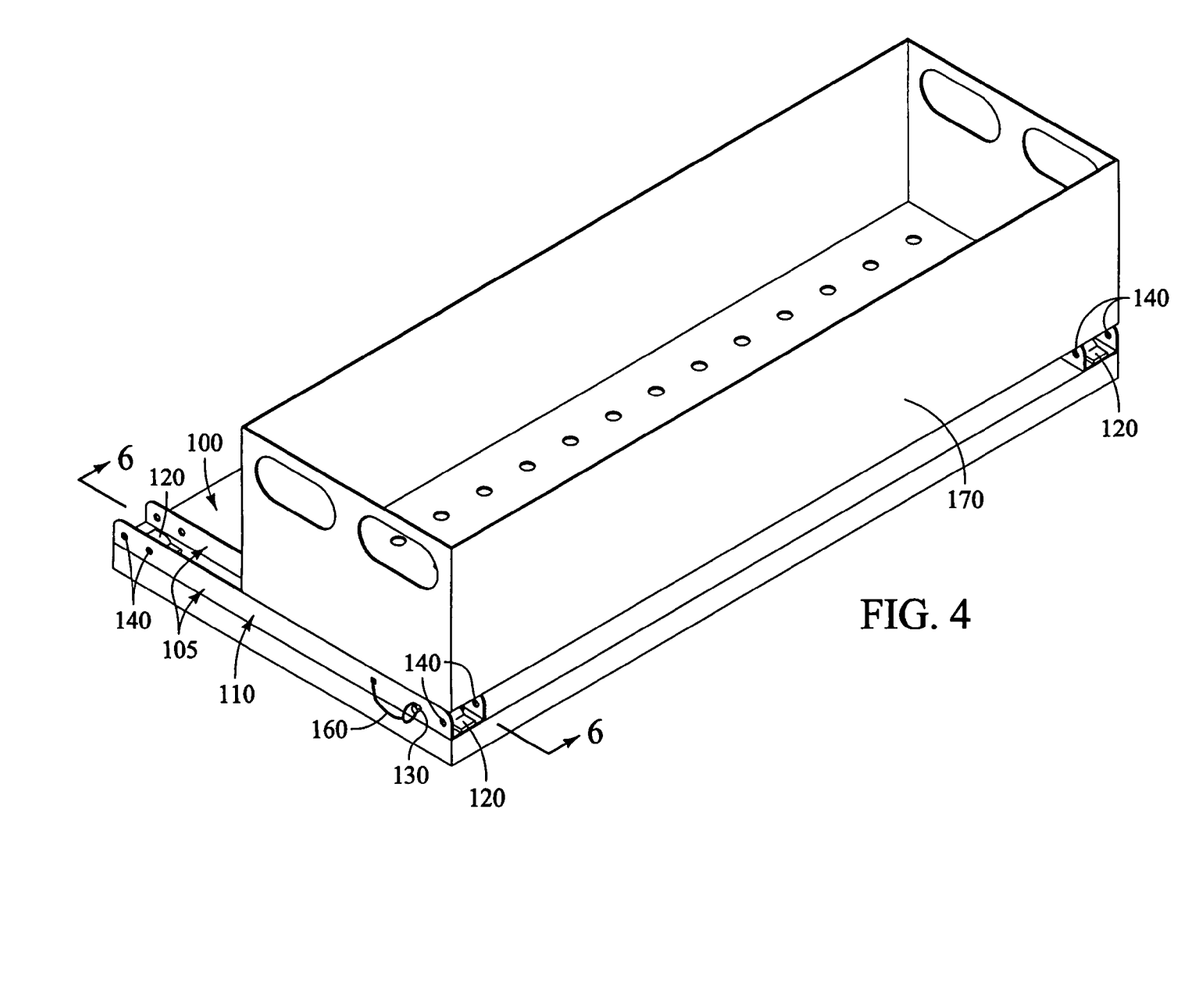
FIG. 4 is a perspective view of an embodiment of the invention with a cargo module mounted on the guide.

FIG. 4 is a perspective view of an embodiment of the invention with a cargo module mounted on the guide. FIG. 4 shows a more detailed view of a cargo module 170 mounted to guides 110. A guide lock 120 is engaged with a cargo lock (not shown) beneath the cargo module 170. The retaining member 130 has been inserted through the hole 140 to prevent the cargo lock (not shown) from disengaging with the guide lock 120.

Figures 5, 6:
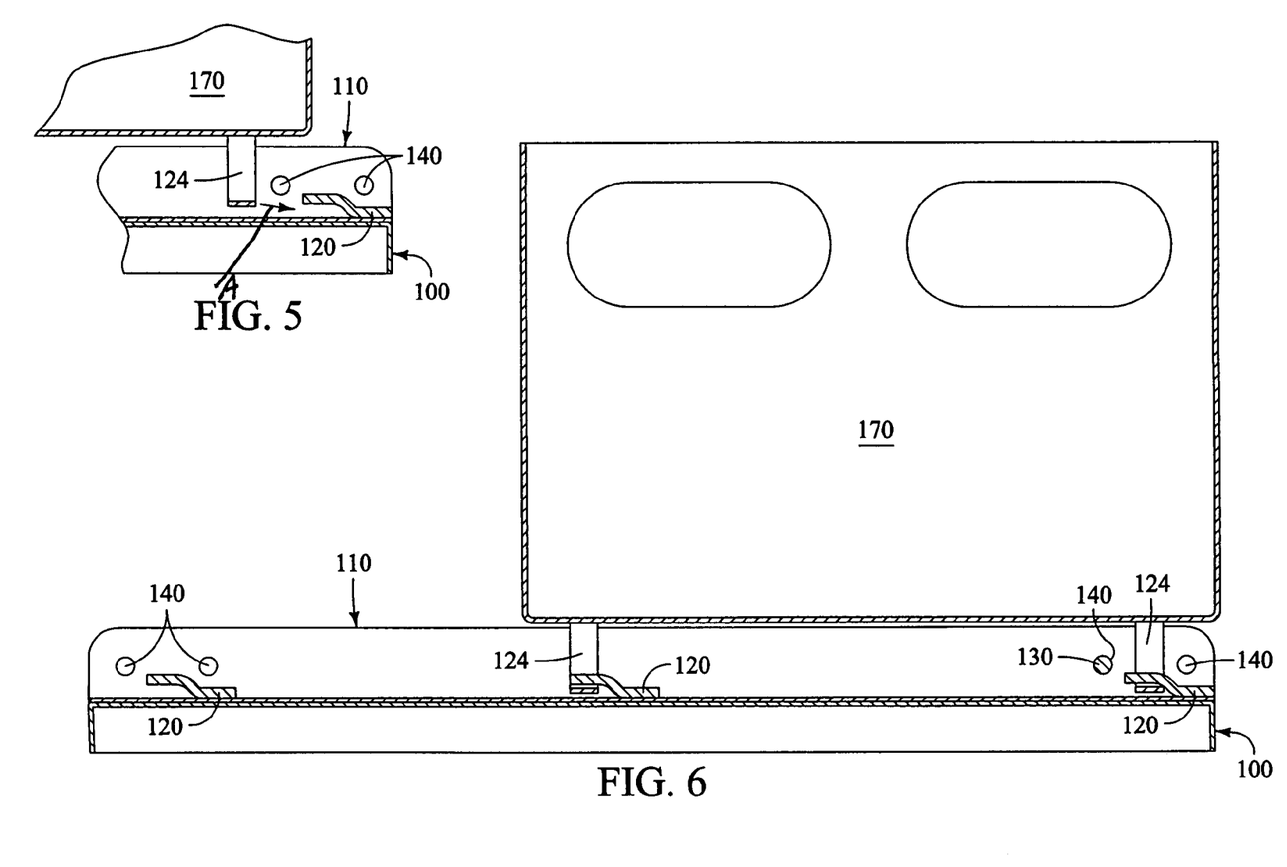
FIG. 5 is a cross section of a portion of a guide and cargo module of the invention.
FIG. 6 is a cross section of a guide and a cargo module of the invention.

FIG. 5 is a cross section of a portion of a guide and a cargo module of the invention. The cargo module 170 has a cargo lock 124 attached to or integral with the cargo module 170. In this embodiment of the invention, the cargo lock 124 is a loop which is inserted in the direction of the arrow under the guide lock 120, in this embodiment a tab. Once the cargo lock 124 and the guide lock 120 are so engaged, the retaining member 130 (not shown) can be inserted through the hole 140 in the guide 110 to ensure that the cargo lock 124 does not become disengaged from the guide lock 120.

FIG. 6 is a cross section of the guide and a cargo module of the invention taken along axis line 6 as indicated on FIG. 4. FIG. 6 shows a cargo module 170 fully fastened to a vehicle as in an embodiment of the invention. Cargo locks 124 are engaged with guide locks 120. A retaining member 130 has been inserted through a hole 140 in a guide 110 which is attached to a rack 100. As shown in FIGS. 5 and 6, it is very easy for the operator to rest a cargo module 170 on a guide 110. When placed in such a position with a cargo lock 124 between the sidewalls of a guide 110, the cargo lock 124 and guide sidewalls 105 cooperate to provide lateral alignment between the cargo module 170 and the guides 110. The operator may then simply slide the cargo module 170 along the guides 110 in the sliding direction generally indicated by arrow A shown in FIG. 5 until the cargo lock 124 engages with a guide lock 120. The engagement of the cargo lock 124 with the guide lock 120 provides for front-to-back alignment of the cargo module 170 with the rack 100 such that the retaining member 130 may be inserted through the hole 140 without the need for further operator alignment of the cargo module 170 with the rack 100. Thus, the guide 110 in cooperation with the cargo lock 124 and the guide lock 120 provide front-to-back and side-to-side alignment for the cargo module 170 with the rack 100. This superior positioning system allows the operator to rest the weight of the cargo module 170 on the guides 110 rather than having to support the load while aligning the fastening means as is typical in prior art cargo mounting devices. This alignment function, in addition to the simple fastening function of the invention, provides for superior mounting of heavy loads required in non-recreational applications of utility vehicles. It is contemplated that an equivalent system could be constructed by placing the guide 110 and guide lock 120 on the cargo module 170 and the cargo lock 124 on the vehicle and fastening the cargo module 170 to the vehicle 10 with similar alignment and ease of use benefits.

Figure 7:
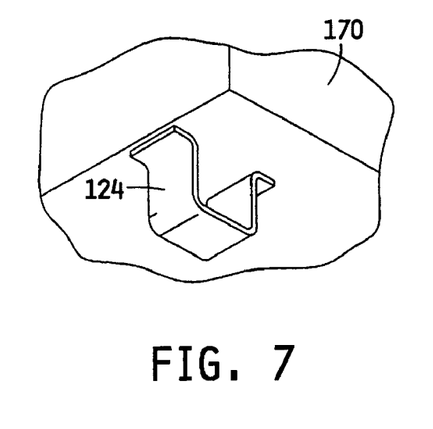
FIG. 7 is a perspective view of a cargo lock of the invention.

FIG. 7 is a perspective view of a cargo lock of the invention. FIG. 7 shows the bottom of a cargo module 170. One possible embodiment of a cargo lock 124 is shown as a loop. As discussed earlier, this lock could be a loop, a tab, a hook, a hole, or any mechanism known to those skilled in the art.

FIG. 8 is a plan view showing the guide, cargo module, guide lock, cargo lock, and retaining member of the invention. FIG. 8 shows an embodiment of the invention wherein a cargo lock 124 and a guide lock 120 are engaged and a retaining member 130 is in place. This view clearly shows how the guide 110, the cargo lock 124, the guide lock 120, and the retaining member 130 may cooperate to securely fasten the cargo module 170 to the rack 100.

Figures 9, 10:
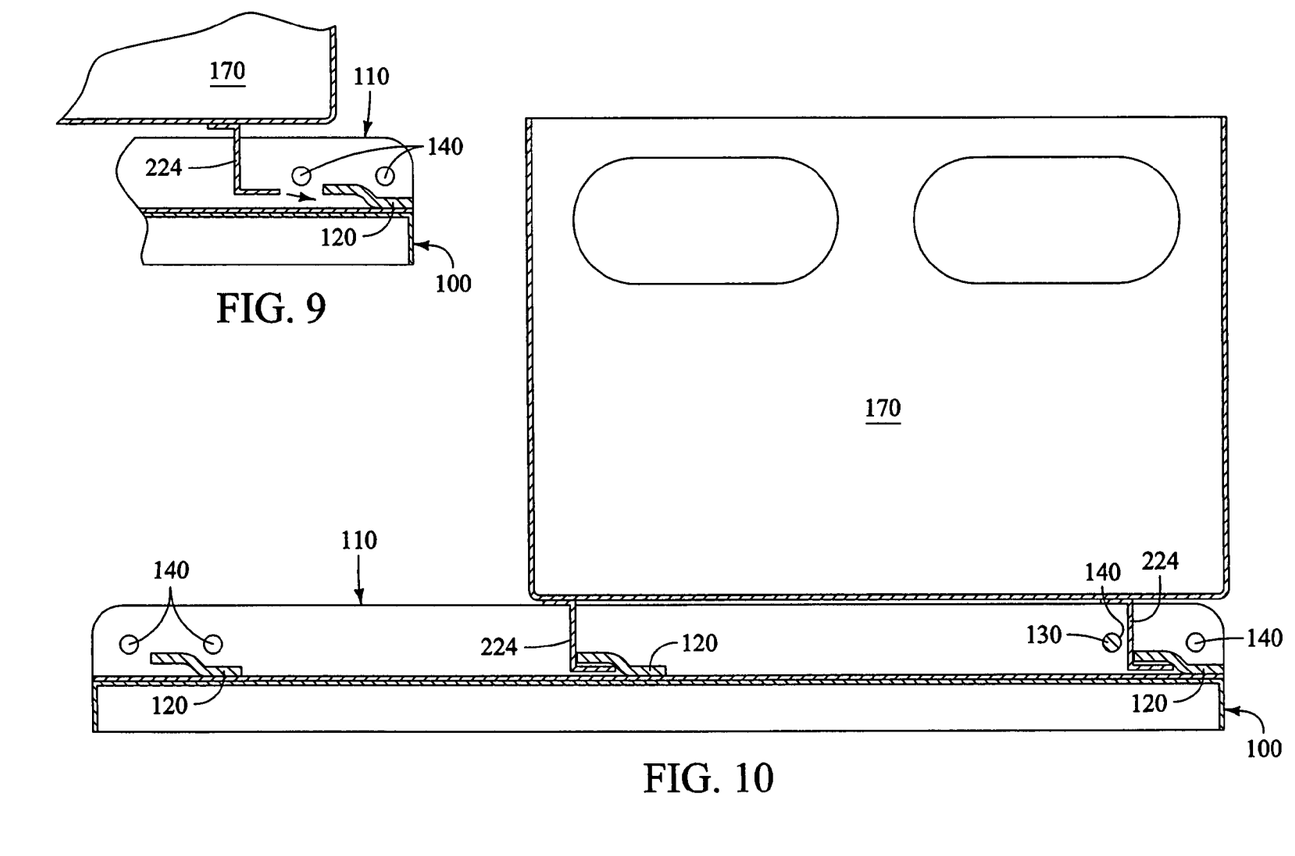
FIG. 9 is a cross section of a portion of another embodiment of a guide and cargo module of the invention.
FIG. 10 is a cross section of another embodiment of a guide and cargo module of the invention.

FIG. 9 is a cross section of a portion of another embodiment of the guide and cargo module of the invention. In FIG. 9, a cargo lock is represented by element 224 in a tab configuration. In this embodiment, the cargo lock 224 engages with a guide lock 120, also a tab, in the fashion described earlier. The retaining member 130 (not shown) may again be inserted through a hole 140 in a guide 110 to ensure that the cargo lock 224 remains engaged with the guide lock 120 and the cargo module 170 is thus securely fastened to the rack 100.

FIG. 10 is a cross section of another embodiment of the guide and cargo module of the invention. In this embodiment of the invention, the cargo lock 224 is a tab. The embodiment in FIG. 10 is shown with the cargo module 170 securely fastened to the rack 100. This is accomplished by cargo locks 224 engaging with guide locks 120. Once so engaged, a retaining member 130 is inserted through a hole 140 in a guide 110 to ensure that the cargo lock 224 remains engaged with the guide lock 120. Again, the cargo locks 224 and guide locks 120 may be tabs, hooks, loops, or any mechanism known in the art which can create such an interlocking connection.

Figures 11, 12:
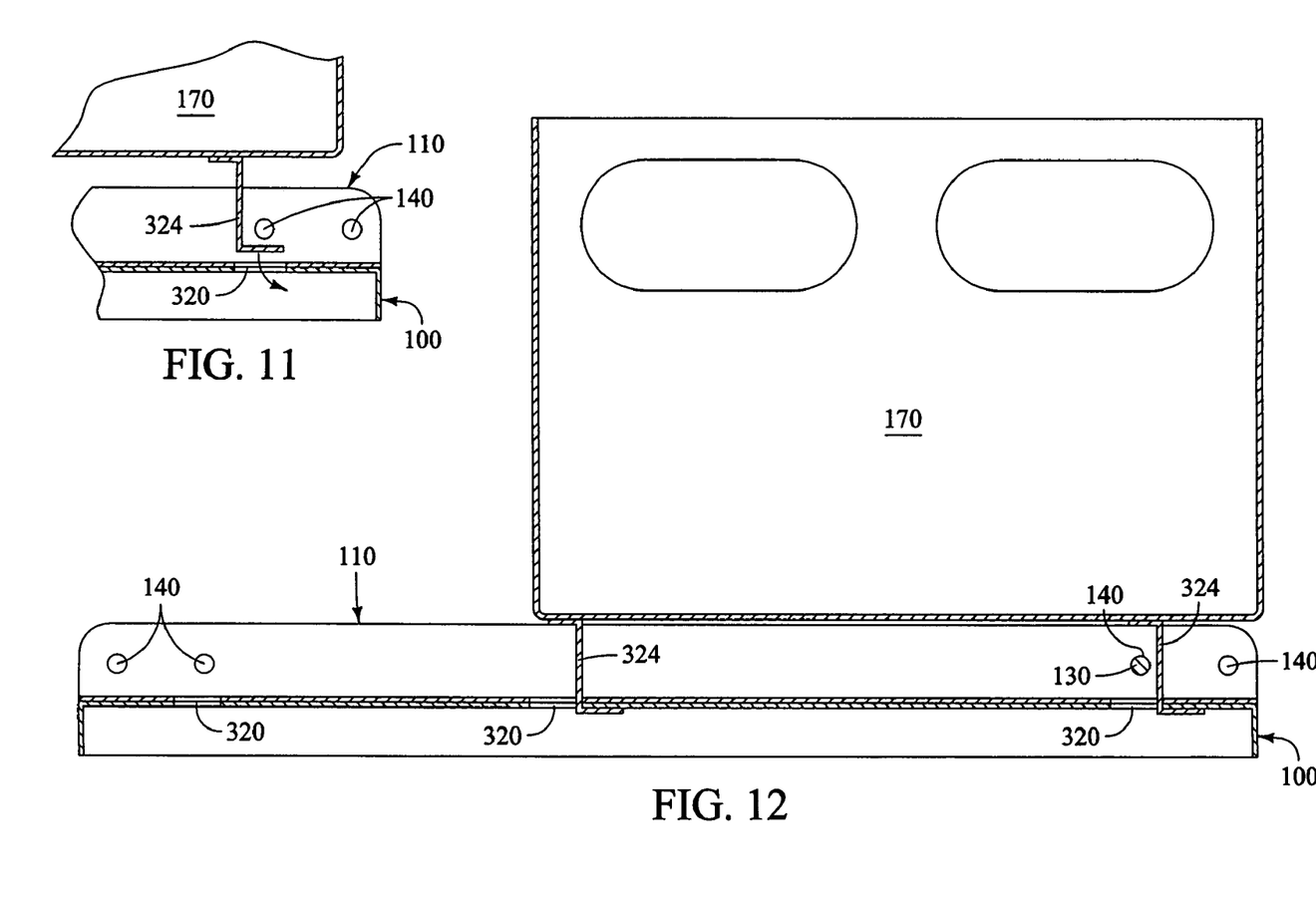
FIG. 11 is a cross section of a portion of a third embodiment of a guide and cargo module of the invention.
FIG. 12 is a cross section of a third embodiment of a guide and cargo module of the invention.

FIG. 11 is a cross section of a portion of a third embodiment of the guide and cargo module of the invention. The guide lock 320 in FIG. 11 is a hole in the bottom of the guide. The cargo lock 324, in this embodiment a tab, is inserted through the guide lock 320 in the direction of the arrow.

FIG. 12 is a cross section of a third embodiment of the guide and cargo module of the invention. FIG. 12 shows the embodiment of FIG. 11 with the fastening system securely engaged. In this embodiment, a cargo module 170 is fastened to a rack 100 by engaging a cargo lock 324 with a guide lock 320 by sliding the cargo module 170 along the guide 110 until the locks engage. Once so engaged, a retaining member 130 is inserted through a hole 140 in the guide 110 to ensure that the cargo lock 324 is not disengaged from the guide lock 320.

In an embodiment of the invention not shown in the figures, a beam may be affixed to or integral with the bottom of a cargo module 170 configured such that when the cargo module 170 is placed on a guide 110, the beam rests within the guide 110. The cargo lock may be attached to the beam rather than directly to the cargo module 170. This embodiment makes it simpler for the cargo lock to be a hole as in FIG. 12, which will be engaged with a guide lock when the beam is placed within the guide. It may be advantageous for the cargo lock to be a simple hole in that when the cargo module 170 is not engaged with the vehicle, the cargo module could have no projections which may become obstacles to normal use of the cargo module.

It is to be understood that the described embodiments of the invention are illustrative only, and that modifications thereof may occur to those of ordinary skill in the art. Accordingly, this invention is not regarded as limited to the disclosed embodiments but only as defined by the appended claims herein.

What is claimed is:

1. A system for removably securing a cargo module to a vehicle, the cargo module having a cargo lock tab extending from a surface of the cargo module, the system comprising: an elongate guide carried by the vehicle for mounting and supporting the cargo module, the guide having a bottom and two opposing elongate sidewalls extending from the bottom and defining an inside slide path therebetween, the inside slide path configured to slidably receive the cargo lock tab, the bottom of the guide having a guide lock hole configured to receive and engage with the cargo lock tab, the system further including a retaining member protruding into the inside slide path proximal the guide lock hole, the retaining member engaging with the cargo lock tab to prevent the cargo lock tab from disengaging from the guide lock hole thereby securing the cargo module to the vehicle.

2. The system of claim 1, wherein at least one of the sidewalls includes a retaining member receiving hole extending therethrough and the retaining member is a pin removably extending through the retaining member receiving hole.

3. The system of claim 1, wherein the engagement of the cargo lock tab with the guide lock hole restricts removal of the cargo lock from the guide.

4. The system of claim 1, wherein the engagement of the cargo lock tab and the guide lock hole restricts the sliding movement of the cargo lock tab within the slide path along a sliding direction.

5. The system of claim 4, wherein the retaining member restricts movement of the cargo module relative to the vehicle in a direction opposite the sliding direction.

6. A system for removably securing a cargo module to an all terrain vehicle, comprising: a chassis carrying a straddle type seat, at least one front wheel, at least one rear wheel, a steering member for steering the vehicle, an engine supported by the chassis wherein the engine is operably coupled to at least one of the wheels, a pair of elongate guides carried by the all terrain vehicle for mounting the cargo module, each guide having a bottom and two opposing elongate sidewalls defining an inside slide path of such guide therebetween, a guide lock located within the inside slide path of each guide, a portion of each guide lock being spaced apart from and extending along a portion of one of the bottom and the sidewalls, at least one sidewall of each guide having a hole for receiving a retaining member, the cargo module having a pair of cargo locks extending from a surface thereof, the cargo module configured to slide atop the guides with one cargo lock slidably retained inside the slide path of each guide until the cargo locks engage the respective guide locks by being received between the guide lock and the one of the bottom and the sidewalls, each guide sidewall hole being located such that when the guide locks engage the respective cargo locks, insertion of the retaining members through the respective holes restricts the cargo locks from disengaging from the respective guide locks thereby securing the cargo module to the vehicle.

7. The system of claim 6, wherein the guide lock is located on the bottom of the guide.

8. The system of claim 6, wherein the guide lock is a tab.

9. The system of claim 6, wherein the cargo lock is a loop.

10. The system of claim 6, wherein the engagement of the cargo lock and the guide lock cooperate to restrict movement of the cargo lock within the slide path along a sliding direction.

11. The system of claim 6, wherein the engagement of the cargo lock with the guide lock restricts removal of the cargo lock from the guide.

12. The system of claim 6, wherein the retaining member restricts movement of the cargo module relative to the vehicle in a direction opposite the sliding direction.

13. A recreation or utility vehicle comprising a chassis carrying a straddle type seat, at least one front wheel, at least one rear wheel, a steering member for steering the vehicle, an engine supported by the chassis wherein the engine is operably coupled to at least one of the wheels, a rack supported on the chassis, a cargo module removably mounted on the rack, and a retaining member, the rack including a pair of guides, each of the guides having a bottom, two sidewalls extending upwardly from the bottom and defining an elongate slide space therebetween, and at least one guide lock located inside of the slide space, at least one of the sidewalls including a hole extending therethrough, wherein one of the cargo lock and the guide lock is a tab and the other of the cargo lock and the guide lock is a loop, the cargo module having a locked position wherein the tab releasably engages the loop to restrict the removal of the cargo lock from the slide space and the retaining member is removably extending through the hole and into the slide space, and an unlocked position wherein the tab is released from the loop and the retaining member is removed from the hole such that the cargo lock is removable from the slide space.

14. The cargo system of claim 13 wherein at least one of the sidewalls includes a pin receiving hole extending therethrough and the retaining member is a pin removably extending through the pin receiving hole and into the slide path.

15. The cargo system of claim 13 further comprising a cable coupled at one end to the retaining member and at the other end to the guide.

16. The cargo system of claim 13 further comprising a second guide mountable to the vehicle at a position parallel to and spaced apart from the guide, and the cargo module having a second cargo lock engagable with the second guide.

17. The cargo system of claim 13 wherein the cargo lock is the loop and the guide lock is the tab.

18. The cargo system of claim 17 wherein the tab is mounted on the bottom of the guide and a portion of the tab is spaced apart from and extends along the bottom of the guide.

19. The cargo system of claim 17 wherein the tab is mounted on one of the sidewalls of the guide and a portion of the tab is spaced apart from and extends along the one of the sidewalls of the guide.

20. The cargo system of claim 13 wherein the cargo lock is the tab and the guide lock is the loop, a portion of the tab is spaced apart from and extends along the surface of the cargo module.

21. The cargo system of claim 20 wherein the loop is mounted on and extends from the bottom of the guide.

22. The cargo system of claim 20 wherein the loop is mounted on and extends from one of the sidewalls of the guide.

\* \* \* \* \*